United States Patent [19]

Markert

[11] Patent Number: 4,723,340
[45] Date of Patent: Feb. 9, 1988

[54] MACHINE FOR DRAWING POULTRY

[75] Inventor: Heinrich W. Markert, Otterlo, Netherlands

[73] Assignee: Machinefabriek Markert BV, Ede, Netherlands

[21] Appl. No.: 893,608

[22] Filed: Aug. 6, 1986

[30] Foreign Application Priority Data

Aug. 22, 1985 [DE] Fed. Rep. of Germany ... 8524126[U]

[51] Int. Cl.⁴ ............................................. A22C 21/06
[52] U.S. Cl. ..................................................... 17/11
[58] Field of Search ............................................ 17/11

[56] References Cited

U.S. PATENT DOCUMENTS 4,467,498  8/1984  Graham et al. ...................... 17/11 X
4,486,920  12/1984  Tieleman et al. .................... 17/11 X
4,516,290  5/1985  Van Mil .................................. 17/11

Primary Examiner—Willie G. Abercrombie
Attorney, Agent, or Firm—Shapiro and Shapiro

[57] ABSTRACT

A drawing machine of the carousel type for poultry, especially turkeys, has a working zone of 180°, a hoop-shaped drawing rod, and at least one hoop-shaped support for the bird. The drawing rod and support are detachably mounted and are also spring-loaded so that they are inherently adaptable to a limited extent to birds of slightly different size. They can also be exchanged for other drawing rods and supports to cope with birds of substantially different sizes, thereby to permit evisceration of poultry of a range of sizes easily and efficiently without damage to the meat.

14 Claims, 2 Drawing Figures

MACHINE FOR DRAWING POULTRY

FIELD OF THE INVENTION

This invention relates to machines for the drawing, i.e. eviscerating, of poultry.

The invention is particularly concerned with a drawing machine of the carousel type for poultry, especially turkeys, which has a rotary station encompassing a working zone of 180°. The machine incorporates a drawing rod and at least one supporting hoop which are mounted to be movable under the control of cam means. A suspension conveyor is used for the delivery of the birds into the working zone.

Such drawing machines of the carousel type are well known for this type of activity. By means of these machines it is possible to carry out a fully automatic drawing of poultry. There has always been a problem with such machines in adapting the functional components to the size of the birds. Particularly with turkeys, there are considerable differences in size, from 3 to 20 kg, which have to be taken into account where one wishes to ensure that the drawing operation can be performed independently of the size of the birds and without damaging the body and the entrails of the poultry.

SUMMARY OF THE INVENTION

It is an object of the present invention to provide a drawing machine of the carousel type which is adaptable to cope with birds of different sizes and which can also take account of small differences in size without modification, so that drawing of the birds can be achieved in a simple manner without damage to them.

This object is achieved in accordance with the present invention by a drawing machine of the carousel type for poultry, especially turkeys, comprising a rotary station encompassing a working zone of 180°, a drawing rod and at least one bird support means mounted at the rotary station, cam means arranged to control movement of the drawing rod and of the support means, and a suspension conveyor for delivering the birds to the working zone, in which the drawing rod and the support means are detachably mounted on movable holders and are subject to the action of respective spring means.

By making the essential functional components detachable and thus exchangeable for others of different size and/or configuration, the invention permits adaptation of the machine to cope with the different sizes of poultry. A finer adaptation for different sizes of poultry is achieved if the respective spring means provided in combination with the holders for the drawing rod and the support means are designed such that after contact with a predetermined force between drawing rod or support means on the one hand, the spring force will be exceeded should the contact force increase, and the bird on the other hand.

According to a preferred embodiment of the invention, the support means comprises a supporting hoop or hoops, the support means is displaceable vertically between the legs of a bird, and the force of the spring means acting on said support means is directed vertically downwards thereby to urge a guide roller for said support means against a cam track, whereby the spring means performs a double function - namely, on the one hand, a compensating adaptation for small differences in size of the birds and, on the other hand, a biasing of a guide roller against the control cam track.

For easy evisceration of the poultry by means of the drawing rod and for a desirable cooperation of the drawing rod with the back of the bird to achieve reliable and non-damaging introduction of the drawing rod, a spring-loaded back support means is preferably arranged to be horizontally movable into and out of contact with the back of a bird in the working zone back support means is controlled preferably by cam means and indeed with the most accurate adaptation to the control of the other component parts.

A wing-supporting hoop is preferably fitted to the back support means in order to hold the bird down against the withdrawal movement of the drawing rod.

BRIEF DESCRIPTION OF THE DRAWINGS

One presently preferred embodiment of machine in accordance with the invention will now be described in more detail, by way of example, and with reference to the drawings. In the drawings.

DESCRIPTION OF THE PREFERRED EMBODIMENT

Figure 1:
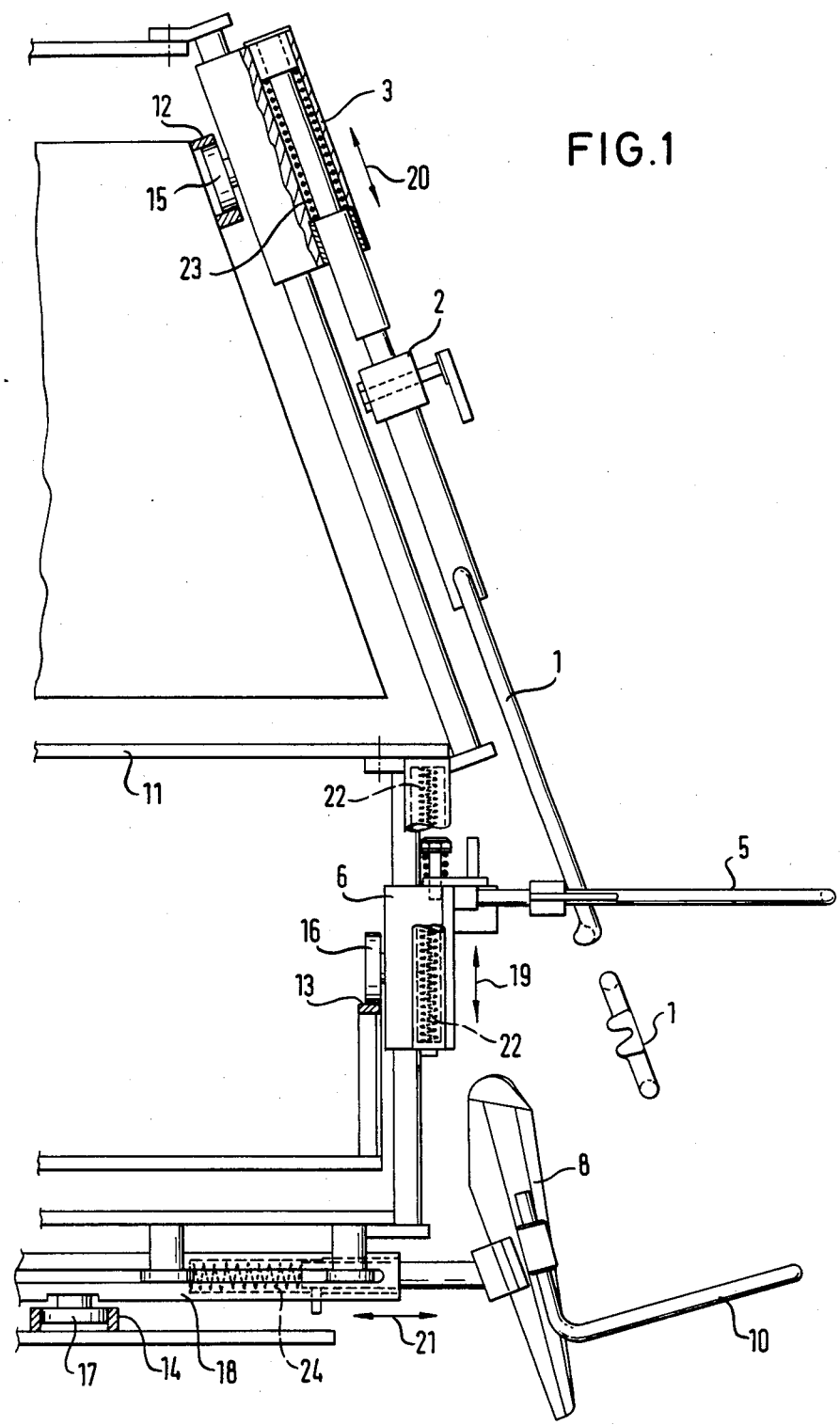
FIG. 1 is a sectional view through a part of the drawing machine, showing the components in their initial positions before the drawing process; and, FIG. 2 is a similar sectional view, but showing the components in the positions which they occupy during the drawing movement.
Figure 2:
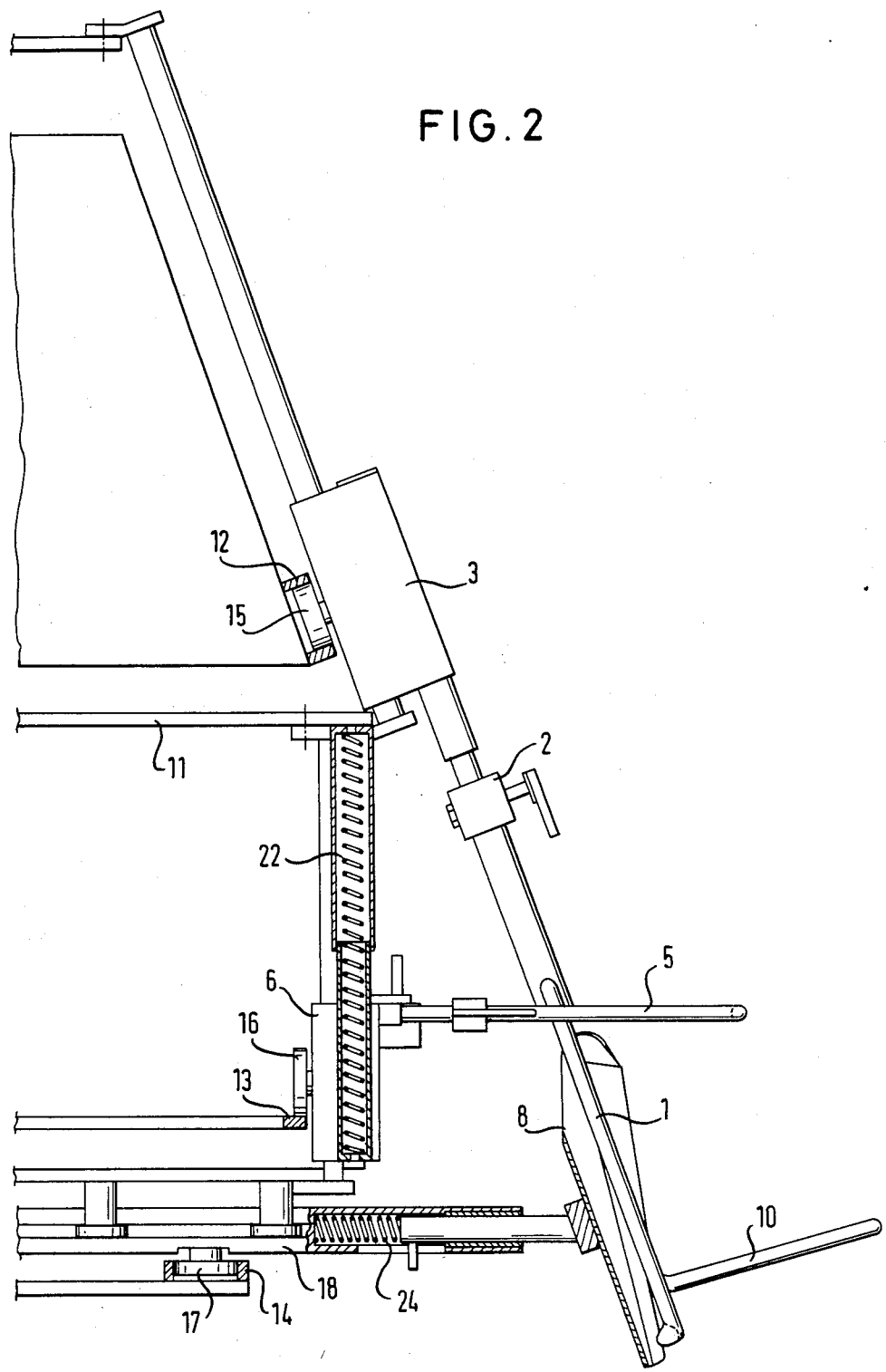

The carousel portion of the drawing machine, shown in the drawings, includes as important components a drawing rod 1, a supporting hoop 5 and a back support 8 in the form of a yoke. All of these components rotate, together with a carousel frame 11, about a vertical axis which is not shown in the drawings. Stationarily arranged cam tracks 12, 13 and 14 are associated with this frame 11, and guide rollers 15, 16 and 17 respectively are movable in or are arranged to roll on these tracks. Roller 15 is coupled to a slide block 3, roller 16 is coupled to a slide block 6 and roller 17 is coupled to a slide block 18. A drawing rod or eviscerating rod 1, which is detachably (releasably) secured by a clamping device 2, is connected to slide block 3. The supporting hoop 5, which is likewise detachable (releasable), is mounted on slide block 6. The aforesaid back support yoke 8 is mounted on slide block 18, and an additional wing-supporting hoop 10 is located on the back support yoke 8. In FIG. 1, below the lower end of the drawing rod 1, there is shown an end view of the drawing rod 1 in order better to be able to appreciate its configuration. The drawing rod 1 is in the form of a U-shaped hoop, with a crosspiece of the hoop at its lower end specially shaped with a clamping recess, as shown.

Slide block 6, which is connected to the supporting hoop 5, is movable in the vertical direction, in accordance with the double-headed arrow 19 shown in FIG. 1. Slide block 3 is movable back and forth in a direction which is inclined to the vertical, as indicated by the double-headed arrow 20. Slide block 18 is movable back and forth horizontally as indicated by double-headed arrow 21. These movements take place, as stated, by means of the sliding linkage provided by the rollers 15 to 17 and the cam tracks 12 to 14.

A spring 22 acts on slide block 6 in such a manner that the spring urges the slide block downwards, i.e. it biases roller 16 against the cam track 13. In slide block 3, the drawing rod 1 works against a spring 23 so that the drawing rod, when it comes up against a resistance, is movable further by compression of the spring. Finally, in a similar manner, slide block 18 and consequently the back supporting hoop 8 works against a spring 24.

The carousel drawing machine, which is particularly suitable for turkeys, has a working zone extending through 180°. The birds hang by their feet from hooks which are guided into the machine by a chain (not shown) of a suspension track (not shown). A guide wheel guides the chain through 180° through the machine. The bird is thus guided into the machine so that, first of all, the supporting hoop 5 is positioned between the legs of the bird. This supporting hoop 5 is detachable fixed to slide block 6.

Before the birds enter into the machine, the aforementioned components of the machine occupy the positions shown in FIG. 1, i.e. the drawing rod 1 is taken upwards to its full extent, and the same applies to the supporting hoop 5. The back supporting yoke 8 adopts a position in which it is fully retracted to the left, as shown in FIG. 1. When now the bird comes to the region of the supporting hoop 5, the bird, together with the supporting hoop, moves further on in the horizontal circular path, with the result that then, by virtue of the special configuration of the cam track 13, the spring 22 presses slide block 6 and consequently the supporting hoop 5 downwards between the legs of the birds until the supporting hoop 5 comes into contact with the bird. The spring mechanism ensures that the supporting hoop is always correctly positioned against the bird, even for birds of different sizes. The spring must of course be appropriately dimensioned.

Following on from this, the drawing rod 1 is guided into the body of the bird and moves downwards against the inside of the breast until it reaches the deepest point. The drawing rod 1 is likewise releasably and exchangeably fixed to slide block 3 in order to be able to adapt it to birds of different sizes. The spring 23 in slide block 3 likewise compensates for different size birds. When the drawing rod 1 strikes against the lowest point within the bird, and in spite of the fact that slide block 3 continues to move further downwards, only the spring 23 is compressed. The spring 23 must be so designed that on the one hand one ensures a trouble-free insertion of the drawing rod and on the other hand one avoids any damage to the body of the bird upon the compression of the spring.

When the drawing rod is located in the lowest position, the back supporting yoke or the back support 8 is guided forwards. Thus, spring 24 likewise has a double function. The spring on the one hand compensates for different sizes in the backs of the birds and on the other hand presses the back of the bird with a certain force against the drawing rod.

By the advancing movement of the back support, the drawing rod 1 traverses the body cavity of the bird from breast to back and arrives against the back of the bird. By this movement the internal organs, i.e. entrails, are pushed to the side by the drawing rod. Thus, the internal organs are located on the other side of the drawing rod, i.e. on the breast side of the rod. If, next, the drawing rod 1 is moved upwards again, the lower part of its hoop scrapes along the inside of the back of the bird, and the entrails of the bird are lifted out with the rod. Because of the special shape of the lower part of the drawing rod, as it is shown in FIG. 1, the lungs are removed with the rod or else at least the membrane which surrounds the lungs is damaged with the result that the lungs are partially or completely freed. The wing-supporting hoop 10 prevents upward movement of the bird when the drawing rod is raised and when the entrails are withdrawn.

When the drawing rod 1 has been withdrawn from the body of the bird, the entrails hang above the body of the bird from the hoop-shaped lower portion of the drawing rod, although they are still partly connected to the body of the bird. Therefore, next, the back support 8 moves fully forwards below the drawing rod, with the result that the body of the bird is guided forwards. In this way the drawing rod is located above the body of the bird but behind its back. The entrails then fall back through the hoop-shaped rod and remain hanging on the back of the bird.

Finally, all the parts return to their original positions and by use of water jets are cleaned before the next operation.

With this arrangement, due to the exchangeability of the drawing rod 1 and of the supporting hoop 5, turkeys of from 3 to 20 kg in weight can be handled in three different size ranges.

I claim:

1. A drawing machine of the carousel type for poultry, especially turkeys, in which birds are delivered to a working zone by a suspension conveyor, comprising a rotary station encompassing a working zone of about 180° and to which said conveyor delivers birds for processing, a drawing rod mounted at said rotary station and movable toward and away from a working position for insertion into and withdrawal from a bird supported for processing at said working position, bird support means mounted at said station for supporting the bird in said working position, said bird support means including back support means movable toward and away from said working position for engaging and supporting the back of the bird, first cam means coupled to said drawing rod for effecting movement of said drawing rod toward and away from said working position, second cam means coupled to said back support means for effecting movement of said back support means toward and away from said working position, first spring means biasing said drawing rod in the direction of insertion of said drawing rod into the bird, said first spring means having a spring force selected such that when said drawing rod contacts the bird with more than a predetermined force the spring force of said first spring means is exceeded, and second spring means coupled to said back support means and biasing said back support means toward engagement with the back of the bird, said second spring means having a spring force selected such that when said back support means contacts the bird with more than a predetermined force the spring force of said second spring means is exceeded.

2. A drawing machine according to claim 1, wherein said drawing rod is releasably attached to a drawing rod holder coupled to said first cam means and movable toward and away from said working position by said first cam means.

3. A drawing machine according to claim 2, wherein said drawing rod is attached to said drawing rod holder by releasable clamp means.

4. A drawing machine according to claim 1, wherein said drawing rod has the form of a U-shaped hoop having a gripping recess in a cross-piece joining respective legs of the hoop at a free end of the hoop.

5. A drawing machine according to claim 1, wherein said back support means has a wing-supporting hoop mounted thereon.

6. A drawing machine according to claim 1, wherein said bird support means further includes a support member movable toward and away from said working position between the legs of the bird in said working position and engageable with the bird between the bird's legs, and third cam means coupled to said support member for effecting movement of said support member toward and away from said working position.

7. A drawing machine according to claim 6, wherein said back support means moves horizontally toward and away from said working position and wherein said support member moves vertically toward and away from said working position.

8. A drawing machine according to claim 6, wherein said support member includes a hoop.

9. A drawing machine according to claim 6, including third spring means biasing said support member toward said working position, said third spring means having a spring force selected such that when said support member contacts the bird in said working position with more than a predetermined force, the spring force of said third spring means is exceeded.

10. A drawing machine according to claim 9, wherein said support member is attached to a holder which is coupled to said third cam drive means, said third spring means biasing said support member holder toward said working position.

11. A drawing machine according to claim 10, wherein said support member is releasably attached to said support member holder.

12. A drawing machine according to claim 11, wherein said support member is attached to said support member holder by releasable clamp means.

13. A drawing machine according to claim 1, wherein said back support means is movable horizontally toward and away from said working position and wherein said drawing rod is movable generally vertically toward and away from said working position.

14. A drawing machine according to claim 1, wherein said back support means advances further in the direction of engagement with the bird following withdrawal of said drawing rod from the bird, thereby causing entrails removed from the bird to fall onto the back of the bird.

* * * * *